US012656243B2

(12) United States Patent　　(10) Patent No.:　US 12,656,243 B2
Parsinejad et al.　　　　　　　　(45) Date of Patent:　Jun. 16, 2026

(54) FLEXIBLE PIPE ARMOR WIRE MONITORING SYSTEM AND METHOD

(71) Applicant: Chevron U.S.A. Inc., San Ramon, CA (US)

(72) Inventors: Farzan Parsinejad, Houston, TX (US); Matthew Davis Hense, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 310 days.

(21) Appl. No.: 16/561,237

(22) Filed: Sep. 5, 2019

(65) Prior Publication Data

US 2021/0072146 A1　　Mar. 11, 2021

(51) Int. Cl.
　　G01N 17/04　　　(2006.01)
　　F16L 11/08　　　(2006.01)

(52) U.S. Cl.
　　CPC .......... G01N 17/046 (2013.01); F16L 11/081 (2013.01)

(58) Field of Classification Search
　　CPC .......... B32B 1/08; B32B 15/08; B32B 27/00; Y10T 428/13; Y10T 428/139; F16L 11/04; G01N 17/046; B32V 15/08
　　USPC ................................. 428/35.7, 36.9
　　See application file for complete search history.

(56) References Cited

U.S. PATENT DOCUMENTS 3,617,145 A　　11/1971　Celmer et al.
4,019,333 A　*　4/1977　Karsan ...................... F16L 1/26
　　　　　　　　　　　　　　　　　　　　　285/64

4,120,313 A　　10/1978　Lewis
4,179,920 A　*　12/1979　Schuller ................ G01N 17/00
　　　　　　　　　　　　　　　　　　　　　73/86
4,501,323 A　　2/1985　Lively et al.
4,563,427 A　　1/1986　Weiss et al.
4,569,786 A　*　2/1986　Deguchi .................. H01B 1/24
　　　　　　　　　　　　　　　　　　　　　524/495
4,603,113 A　　7/1986　Bauer
4,605,065 A　　8/1986　Abercrombie
4,688,638 A　　8/1987　Williams
4,697,465 A　　10/1987　Evans et al.
4,928,760 A　　5/1990　Freitas
4,945,758 A　*　8/1990　Carpenter ............... F16L 55/00
　　　　　　　　　　　　　　　　　　　　　73/86

(Continued)

FOREIGN PATENT DOCUMENTS

CN　　　101440899 A　*　5/2009

OTHER PUBLICATIONS

Dictionary.com (riser), 2012.*
Cosasco, Oct. 7, 2016.*

*Primary Examiner* — Aaron Austin
(74) *Attorney, Agent, or Firm* — Avery L. Cate

(57)　　　ABSTRACT

Disclosed are systems and methods for monitoring armor wires in a flexible pipe by inferring a condition of the armor wires using at least one polymeric coupon containing steel wires. The coupon is designed to simulate the conditions of the armor wires in the annulus of the flexible pipe. The coupon is removably held by a coupon holder in the bore of a surface pipe connected to the flexible pipe. The coupon can be removed from the bore of the surface pipe after a period of time to dissect the coupon and evaluate the steel wires. The systems and methods allow insight into the condition of the armor wires during operational life that does not otherwise exist at present.

20 Claims, 3 Drawing Sheets

(56)　　　　　　References Cited

U.S. PATENT DOCUMENTS

| | | | |
|---|---|---|---|
| 5,076,318 A | 12/1991 | Fedora | |
| 5,095,977 A | 3/1992 | Ford | |
| 5,150,065 A | 9/1992 | Luna | |
| 5,208,162 A | 5/1993 | Osborne et al. | |
| 5,627,749 A | 5/1997 | Waterman et al. | |
| 5,639,959 A | 6/1997 | Reiber | |
| 5,728,943 A | 3/1998 | Colter et al. | |
| 5,814,982 A | 9/1998 | Thompson et al. | |
| 6,060,877 A | 5/2000 | Nekoksa | |
| 6,077,418 A | 6/2000 | Iseri et al. | |
| 6,107,811 A | 8/2000 | Caudill et al. | |
| 6,411,114 B1 | 6/2002 | Grilletto et al. | |
| 6,628,111 B2 | 9/2003 | Shapiro et al. | |
| 6,843,135 B2 | 1/2005 | Douglas et al. | |
| 7,025,138 B2 | 4/2006 | Kurkjian et al. | |
| 7,096,721 B2 | 8/2006 | Bennett | |
| 7,754,808 B2 * | 7/2010 | Goossens | C08L 23/0853 |
| | | | 524/563 |
| 8,033,164 B2 | 10/2011 | Dermody et al. | |
| 8,294,892 B2 | 10/2012 | Sardashti et al. | |
| 8,365,429 B2 | 2/2013 | Lawrence et al. | |
| 8,371,036 B2 | 2/2013 | Lawrence et al. | |
| 8,646,487 B2 | 2/2014 | Thompson et al. | |
| 2004/0231862 A1 | 11/2004 | Kirn et al. | |
| 2004/0265576 A1 * | 12/2004 | De Bondt | B22F 1/062 |
| | | | 428/364 |
| 2012/0031630 A1 * | 2/2012 | Stephens | A62C 3/004 |
| | | | 169/17 |
| 2012/0074969 A1 | 3/2012 | Snelling et al. | |
| 2013/0304680 A1 | 11/2013 | Bailey et al. | |
| 2016/0177633 A1 * | 6/2016 | Tan | F16L 1/24 |
| | | | 29/890.144 |
| 2017/0114931 A1 * | 4/2017 | Glejbol | F16L 11/083 |
| 2019/0056305 A1 | 2/2019 | AlJanabi et al. | |

* cited by examiner

FLEXIBLE PIPE ARMOR WIRE MONITORING SYSTEM AND METHOD

FIELD

The present disclosure relates generally to the field of monitoring armor wire components used in flexible pipe such as that used in the production of oil and gas.

BACKGROUND

A view of the components of conventional flexible pipe used to transport oil and gas in subsea applications can be seen in FIGS. 1A and 1B. A common cause of failure of the flexible pipe 7 is corrosion of the armor wires, including both pressure wires 3 and tensile wires 4, located in the annulus 8 of the flexible pipe. This results in significant replacement cost to replace the flexible pipe 7. During operation, flexible pipe systems are exposed to corrosive fluids and gases (e.g., $CO_2$, $H_2S$) in the bore 6 of the flexible pipe 7. Over time, these gases permeate through the carcass layer 2 and the polymer pressure sheath layer 1 to the high strength pressure wires 3 and tensile wires 4 in the annulus 8, collectively referred to herein as the "armor wire components." The situation is further complicated by the fact that flexible risers often experience damage to the external sheath 5, resulting in a flooded annulus condition. The combination of corrosive gases, low pH, and seawater can result in an annulus environment that corrodes the high strength structural steel layers, i.e., the armor wire components (3 and 4), of the flexible pipe 7. The corrosion rates can vary from a few microns per year for low corrosive environments that are not subject to oxygen renewal, to upwards of 0.1-1 mm per year for highly corrosive environments that are subject to oxygen renewal, such as areas in the splash zone or confined inside of an I-tube.

Several different approaches have been considered to address the operational risks associated with corrosion of flexible pipe armor wire components. For instance, flexible pipe suppliers have performed long duration corrosion tests to attempt to quantify appropriate corrosion rates to consider in design for various annuli conditions. Operators regularly perform annulus tests to determine if the riser annuli are dry or flooded. In some situations when the riser annuli are believed to be flooded, operators have injected different fluid media, such as gel or monoethylene glycol (MEG)/methanol combinations, to slow the corrosion rate experienced by the steel armor wires. Inspection tools are available that can detect the presence of any tensile wire breaks that may have occurred due to corrosion.

All the methods available currently are reactive methods and/or have a high degree of uncertainty. There is no known method of accessing the armor wires in operation without destroying the flexible pipe to understand the degree of corrosion in real time. Furthermore, there is no known method of quantifying the real time corrosion rates that are being experienced by the pressure and tensile armor wire layers, and providing meaningful predictions as to the remaining life of a flexible riser system.

There exists a need for systems and methods for monitoring corrosion of flexible pipe armor wire components which would address the above described current limitations.

SUMMARY

In general, in one aspect, the disclosure relates to a system for monitoring armor wire components in a flexible pipe wherein the flexible pipe has a bore, an annulus, a pressure sheath between the bore and the annulus, an outer sheath surrounding the annulus, and armor wire components within the annulus. The system includes a coupon having a length, width, and height and comprising a polymeric material surrounding a plurality of steel wires; and a coupon holder for holding the coupon in a position such that the coupon extends into the bore of a surface pipe connected to the flexible pipe. The coupon can be removed from the bore of the surface pipe after a desired period of time to evaluate a condition of the steel wires and thereby infer a condition of the armor wire components in the flexible pipe.

In another aspect, the disclosure can generally relate to a method for monitoring armor wire components in flexible pipe. The method includes positioning a coupon such that an end of the coupon extends into a bore of the surface pipe wherein the coupon includes a polymeric material surrounding a plurality of steel wires; and removing the coupon from the surface pipe after a desired period of time to evaluate the steel wires and thereby infer a condition of the armor wire components in the flexible pipe.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1A:
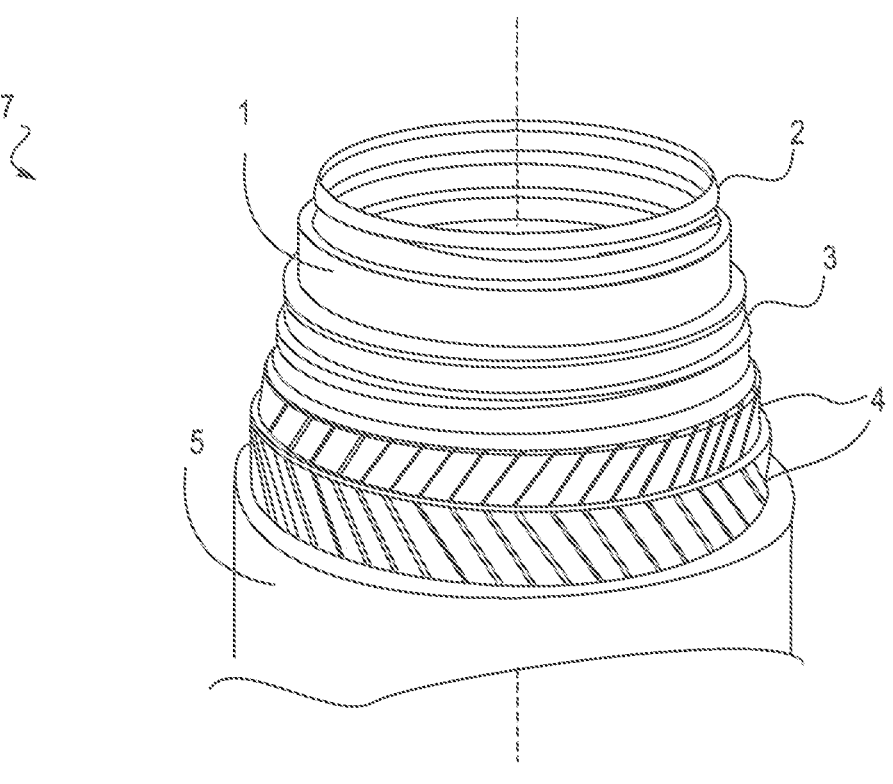
FIGS. 1A and 1B illustrate the components of a prior art flexible pipe.
Figure 1B:
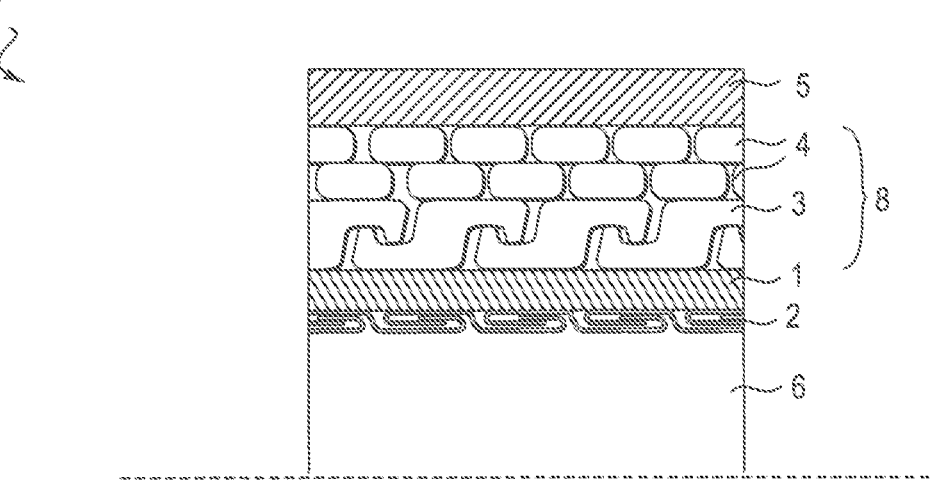

Referring again to FIGS. 1A and 1B, the environment inside a flexible pipe annulus 8 is known to result in less severe corrosion than in traditional offshore rigid pipelines. The combination of the high surface area of steel armor wires (e.g., tensile wires 4, pressure wires 3) to free volume ratio in the annulus 8, the low permeability coefficient of the pressure sheath layer 1, and the limited exposed steel surface due to the presence of corrosion barriers such as manufacturing grease on the armor wires (not shown) result in reduced corrosion rates.

In one embodiment, a system is provided for monitoring armor wire components in a flexible pipe riser by monitoring armor wire components in a test coupon (also referred to as the coupon) placed in the bore of a surface pipe connected to the riser (also referred to as the flexible pipe riser 7) at a surface location on an offshore structure without having to directly monitor the armor wire components in the riser. The coupon can be removed from the bore of the surface pipe after a desired period of time to evaluate a condition of the steel wires therein and thereby infer a condition of the armor wire components in the flexible pipe 7.

Figure 2:
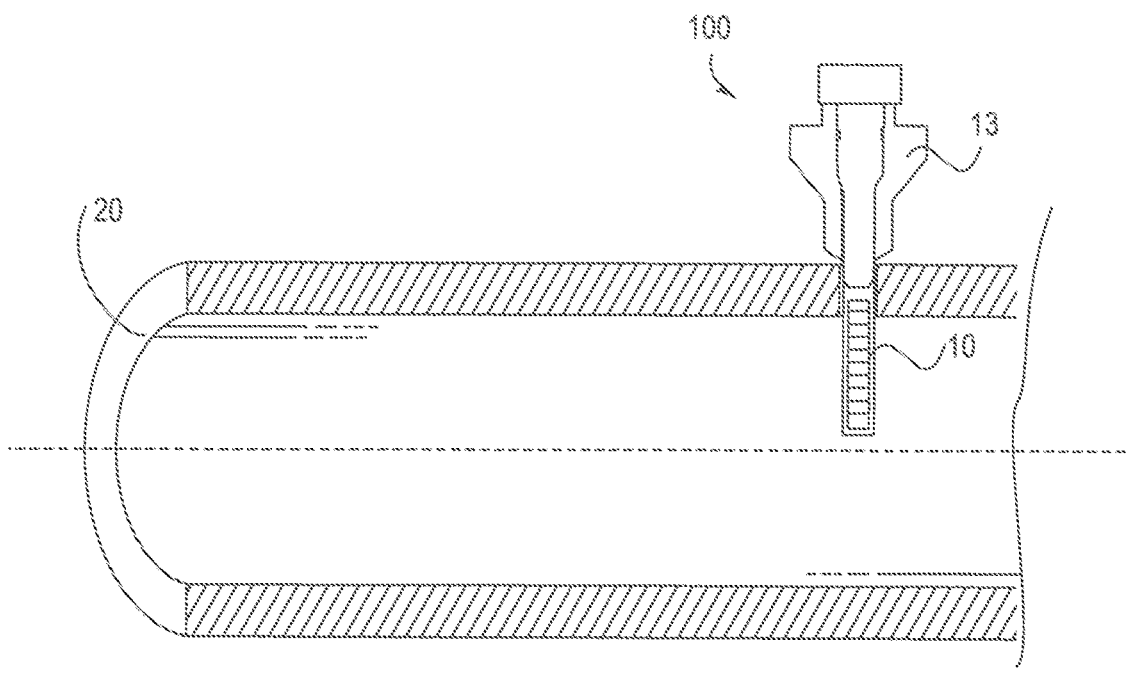
FIG. 2 shows a simplified sectional view of a surface pipe having a system for monitoring armor wire components installed in the flexible pipe according to an exemplary embodiment.

In one embodiment, referring to FIG. 2, a system 100 is provided for monitoring armor wires in a flexible pipe, i.e., a flexible pipe riser as described in the Background, periodically over time. As previously described and as standard for conventional flexible pipe, referring to FIGS. 1A and 1B, the flexible pipe 7 has a bore 6, an annulus 8, a pressure sheath 1 between the bore 6 and the annulus 8, an outer sheath 5 surrounding the annulus, and armor wires 3 and 4 within the annulus 8. The system 100 includes at least one coupon 10 held in a coupon holder 13. FIG. 2 shows ten coupons 10 held in the coupon holder 13. Any number of coupons can be used. The coupon holder 13 holds the coupon 10 so that the coupon 10 extends into the bore of a surface pipe 20 connected to the flexible pipe riser 7. The coupon holder 13 allows the coupon 10 to be removed periodically so that the condition of the steel wires 12 in the polymeric coupon 10 can be inspected. Any suitable means for holding the coupon 10 in place can be used. For example, the coupon holder 13 can be similar to the coupon holder used in the Cosasco® Polymer Coupon Monitoring System commercially available from Cosasco (Santa Fe Springs, California) which consists of a polymer coupon holder and solid plug assembly installed in a standard 2" access fitting that would normally be located in a topside rigid pipe, downstream of the flexible riser end connection. The Cosasco® Polymer Coupon Monitoring System is used to monitor the condition of the polymer in the pressure sheath 1 of the flexible pipe 7. A similar polymer coupon monitoring system for monitoring the condition of the pressure sheath 1 is commercially available from Force Technology (KK&S Instruments, South Windsor, New South Wales, Australia).

Figure 3:
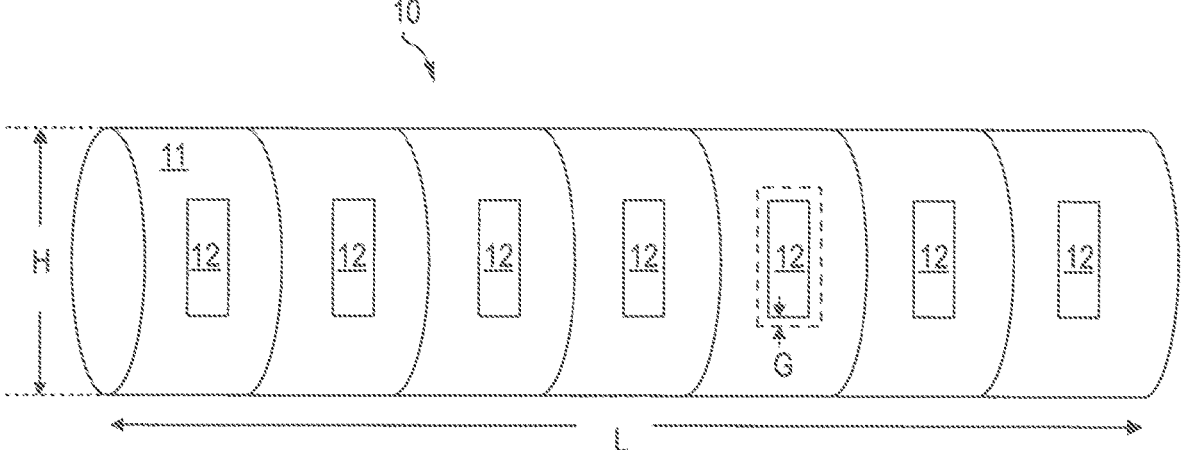
FIG. 3 shows a simplified perspective view of a coupon for use in a system for monitoring armor wire components according to an exemplary embodiment.

Referring to FIG. 3, seven coupons 10 are shown. Each coupon is made of polymeric material 11 surrounding steel wires 12 in a way that the steel wires 12 can be periodically accessed to evaluate their condition. Individual coupons 10 can be removed from the coupon holder 13 periodically and dissected to assess the condition of the steel wires 12. The polymeric material 11 of the coupons 10 has a design to simulate the pressure sheath 1 of the flexible pipe 7. The multiple steel wires 12 of the coupons 10 are designed to simulate the armor wires (3, 4) in the flexible pipe 7. The multiple steel wires 12 of the coupons 10 can include multiple types of steel wires 12, e.g., one to simulate the pressure wires 3, and one to simulate the tensile wires 4. The steel wires 12 will be exposed to the same fluid conditions as the armor wires in the flexible pipe 7. In one embodiment, an optional gap G can be provided between the polymeric material 11 of each coupon 10 and the steel wires 12. The gap G can result in a ratio of a surface area of the steel wires 12 to a volume of the gap G substantially equivalent to a ratio of a surface area of the armor wires (3, 4) to a volume of space surrounding the armor wires within the annulus 8 of the flexible pipe 7. In other words, the free volume to surface area ratio of each coupon 10 can be engineered to represent the expected ratio of the actual flexible pipe annulus 8. Furthermore, the polymeric material 11 of each coupon 10 surrounding the steel wires 12 can have a thickness such that the polymeric material 11 has a permeability resistance substantially equivalent to a permeability resistance of the pressure sheath 1 of the flexible pipe 7. In one nonlimiting example, the coupons 10 can have a cylindrical shape and a thickness of up to 1.5 in (i.e., disk-shaped) to recreate the permeability resistance of the pressure sheath 1.

Figure 4:
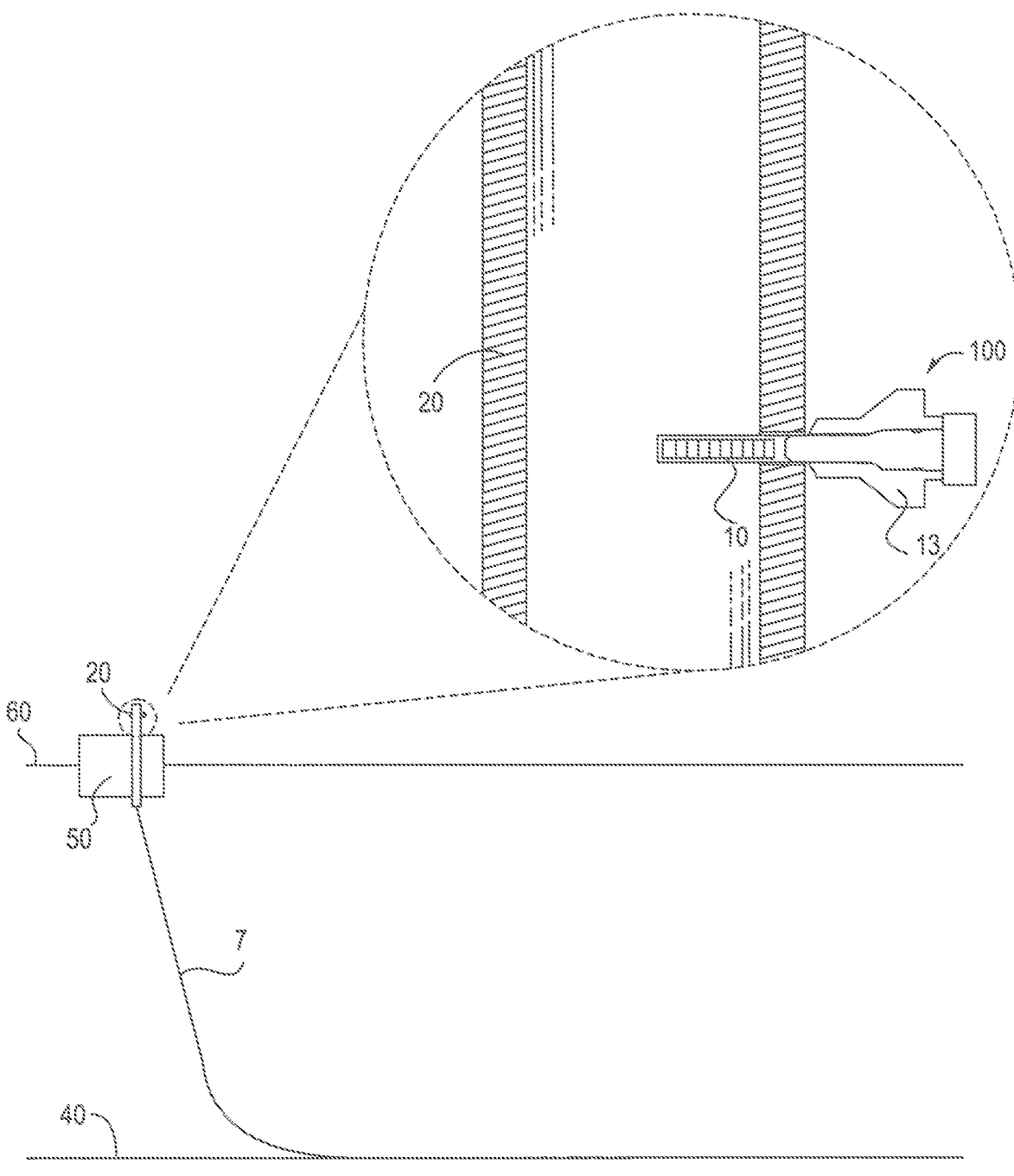
FIG. 4 shows an exemplary placement of a system for monitoring armor wire components on an offshore structure.

Referring to FIG. 4, in one embodiment, the system 100 including the coupons 10 and the coupon holder 13 for monitoring armor wire components (3, 4) on an offshore structure 50 are shown. As shown, the offshore structure 50 (e.g., platform or vessel) is floating such that a portion of the structure is above the surface of the water 60. The flexible pipe riser 7 extends from the seabed 40 to the floating structure 50. On the floating structure 50, the flexible pipe 7 is connected to a surface pipe 20 extending above the surface 60. The surface pipe 20 carries produced fluids from the flexible pipe riser 7 to a destination (not shown). The coupon holder 13 with the coupon(s) 10 therein is in a position such that the coupon(s) 10 extend into the bore of the surface pipe 20. As described previously, the coupon holder 13 can be removed from the bore of the surface pipe 20 periodically at a desired frequency, i.e., after a desired period of time, to evaluate a condition of the steel wires 12 therein, and thus infer a condition of the armor wire components (3, 4) in the flexible pipe 7.

A method for monitoring armor wires (3, 4) in a flexible pipe 7 includes positioning the coupon(s) 10, e.g., in the coupon holder 13, such that the coupon(s) 10 extend into the bore of the surface pipe 20 connected to the flexible pipe 7, and removing the coupon(s) 10 from the surface pipe 20 after a desired period of time to evaluate the steel wires 12. By evaluating the condition of the steel wires 12, the condition of the armor wires (3, 4) of the flexible pipe 7 can be inferred. The coupon(s) 10 can be removed from the bore of the surface pipe 20 at regular intervals of time to evaluate the condition of the steel wires 12. The coupon(s) 10 will be removed from the bore of the surface pipe 20, dissected, and the steel wires 12 will be assessed. By taking samples at regular intervals, the condition of the armor wires (3, 4) can be estimated to much greater accuracy than is possible with current methods. In one embodiment, the coupon(s) 10 are removed from the bore of the surface pipe 20 every 1 to 20 weeks to evaluate the condition of the steel wires 12 until a rate of corrosion of the steel wires 12 stabilizes, i.e., is unchanging. Once the rate of corrosion of the steel wires 12 stabilizes, the coupon 10 can be removed from the bore of the surface pipe 20 every 9 to 15 months to evaluate the condition of the steel wires 12.

In one embodiment, the coupon 10 is placed under tension to increase stress on the steel wires 12 in the coupon 10. The amount of tension can be tailored to simulate the stress levels of the armor wires (3, 4) within the annulus of the flexible pipe 7. In one nonlimiting embodiment, the coupon 10 can be placed under tension using four-point bending by positioning the coupon 10 with two supporting pins on one side of the coupon 10 a set distance apart and two loading pins on an opposing side of the coupon 10 a set distance apart.

In one embodiment, the steel wires 12 are evaluated by weighing them to determine a degree of corrosion of the steel wires 12. In this case, the condition of the armor wires (3, 4) being inferred is corrosion. In one embodiment, the steel wires 12 are evaluated by inspecting them to detect cracks in the steel wires 12. In this case, the condition of the armor wires being inferred is the physical integrity of the armor wires (3, 4).

Any suitable method of manufacture can be used to make the coupon 10. For instance, the coupon 10 can be formed by 3D printing of the polymeric material 11 onto the steel wires 12 using known 3-D printing technology, or by extrusion of the polymeric material 11 onto the steel wires 12 using known polymer extrusion technology.

In one embodiment, at least one of the steel wires 12 can be coated with a predetermined amount of manufacturing grease (not shown). Each of the steel wires 12 can be coated with a different predetermined amount of manufacturing grease ranging from no coverage to full coverage on the surface of the steel wires 12. In this way, more information can be gathered about the condition or performance of the armor wires as relates to the amount of manufacturing grease used thereon.

The coupon monitoring systems and methods disclosed herein provide meaningful results regarding the corrosion rates of the armor wires (including pressure wires 3 and tensile wires 4) in the annulus 8 of the flexible pipe 7. The coupon monitoring systems and methods disclosed herein are advantageously practical, simple, and cost effective solution and will provide actionable data for the purpose of making decisions to extend the lifetime of flexible riser systems. By reproducing the same boundary conditions that drive corrosion in the annulus 8 with an easily retrievable coupon 10, the coupon monitoring system 100 has the ability to provide much improved accuracy on the expected remaining lifetime of a flexible pipe system, allowing for individual assets to make more informed decisions regarding the continuing operation and/or replacement of a given flexible pipe system. This provides a means of predicting when a failure will occur and acting proactively, as compared to existing monitoring solutions which are utilized to assess whether a failure has already occurred (purely reactive).

The flexible pipe 7 can be any suitable application of flexible pipe, such as in risers or located subsea. The coupon monitoring system 100 can be designed and applied to new flexible pipe systems but can also be adapted to be installed on existing systems.

It should be noted that only the components relevant to the disclosure are shown in the figures, and that many other components normally part of flexible pipe systems are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for monitoring armor wire components in a flexible pipe riser that is at least partially located subsea and used to transport oil and gas in a subsea application, wherein the flexible pipe riser has a bore, an annulus, a pressure sheath between the bore and the annulus, an outer sheath surrounding the annulus, and armor wire components within the annulus, the system comprising:

a. at least one coupon comprising a polymeric material surrounding a plurality of steel wires, wherein a gap exists between the polymeric material and the steel wires, and wherein the gap results in a ratio of a surface area of the steel wires to a free volume of the gap substantially equivalent to a ratio of a surface area of the armor wire components to a free volume of space surrounding the armor wire components within the annulus of the flexible pipe riser; and b. a coupon holder for holding the at least one coupon in a position such that the at least one coupon extends into a bore of a surface pipe connected to the flexible pipe riser, wherein one of the at least one coupon can be removed from the bore of the surface pipe after a desired period of time to evaluate a condition of the steel wires and thereby infer a condition of the armor wire components in the annulus of the flexible pipe riser, wherein the coupon holder is configured to extend into the bore of the surface pipe to hold the at least one coupon in the position, and wherein the surface pipe carries produced fluids from the flexible pipe riser to a destination.

2. The system of claim 1 wherein the polymeric material surrounding the plurality of steel wires has a thickness such that the polymeric material surrounding the plurality of steel wires has a permeability resistance substantially equivalent to a permeability resistance of the pressure sheath of the flexible pipe riser.

3. The system of claim 1 wherein the at least one coupon is placed under tension to increase stress on the steel wires in the at least one coupon.

4. The system of claim 3 wherein the amount of tension is set to simulate stress levels of the armor wire components within the annulus of the flexible pipe riser.

5. The system of claim 1 wherein the steel wires are evaluated by weighing the steel wires to determine a degree of corrosion of the steel wires and wherein the condition of the armor wire components in the flexible pipe riser is corrosion of the armor wire components in the flexible pipe riser.

6. The system of claim 1 wherein the steel wires are evaluated by inspecting the steel wires to detect cracks in the steel wires and wherein the condition of the armor wire components in the flexible pipe riser is physical integrity of the armor wire components in the flexible pipe riser.

7. The system of claim 1 wherein the one of the at least one coupon is removed from the bore of the surface pipe at regular intervals of time to evaluate the condition of the steel wires.

8. The system of claim 7 wherein the one of the at least one coupon is removed from the bore of the surface pipe every 1 to 20 weeks to evaluate the condition of the steel wires until a rate of corrosion of the steel wires is unchanging.

9. The system of claim 7 wherein the one of the at least one coupon is removed from the bore of the surface pipe every 9 to 15 months to evaluate the condition of the steel wires.

10. The system of claim 1 wherein the at least one coupon is formed by 3D printing of the polymeric material onto the plurality of steel wires.

11. The system of claim 1 wherein the at least one coupon is formed by extrusion of the polymeric material onto the plurality of steel wires.

12. The system of claim 1 wherein at least one of the plurality of steel wires is coated with a predetermined amount of manufacturing grease.

13. The system of claim 12 wherein each of the plurality of steel wires is coated with a different predetermined amount of manufacturing grease ranging from no coverage to full coverage of a surface area of the plurality of steel wires.

14. The system of claim 1 wherein the at least one coupon has a cylindrical shape and a thickness of up to 1.5 in to recreate a permeability resistance of the pressure sheath.

15. A system for monitoring armor wire components in a flexible pipe riser that is at least partially located subsea and used to transport oil and gas in a subsea application, wherein the flexible pipe riser has a bore, an annulus, a pressure sheath between the bore and the annulus, an outer sheath surrounding the annulus, and armor wire components within the annulus, the system comprising:

a. at least one coupon comprising a polymeric material surrounding a plurality of steel wires, wherein each steel wire of the plurality of steel wires is coated with a different predetermined amount of manufacturing grease ranging from no coverage to full coverage of a surface area of the respective steel wire; and b. a coupon holder for holding the at least one coupon in a position such that the at least one coupon extends into a bore of a surface pipe connected to the flexible pipe riser, wherein one of the at least one coupon can be removed from the bore of the surface pipe after a desired period of time to evaluate a condition of the steel wires and thereby infer a condition of the armor wire components in the annulus of the flexible pipe riser, wherein the coupon holder is configured to extend into the bore of the surface pipe to hold the at least one coupon in the position, and wherein the surface pipe carries produced fluids from the flexible pipe riser to a destination.

16. The system of claim 15 wherein a gap exists between the polymeric material and the steel wires.

17. The system of claim 16 wherein the gap results in a ratio of a surface area of the steel wires to a free volume of the gap substantially equivalent to a ratio of a surface area of the armor wire components to a free volume of space surrounding the armor wire components within the annulus of the flexible pipe riser.

18. The system of claim 15 wherein the polymeric material surrounding the plurality of steel wires has a thickness such that the polymeric material surrounding the plurality of steel wires has a permeability resistance substantially equivalent to a permeability resistance of the pressure sheath of the flexible pipe riser.

19. The system of claim 15 wherein the at least one coupon is placed under tension to increase stress on the steel wires in the at least one coupon.

20. The system of claim 15 wherein the at least one coupon has a cylindrical shape and a thickness of up to 1.5 in to recreate a permeability resistance of the pressure sheath.

* * * * *